US009880765B2

(12) United States Patent
Sakai et al.

(10) Patent No.: US 9,880,765 B2
(45) Date of Patent: Jan. 30, 2018

(54) COPY PROCESSING MANAGEMENT SYSTEM AND COPY PROCESSING MANAGEMENT METHOD

(71) Applicant: HITACHI, LTD., Tokyo (JP)

(72) Inventors: Atsushi Sakai, Tokyo (JP); Hiroshi Ooki, Tokyo (JP); Shingo Maeda, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/120,846

(22) PCT Filed: Nov. 7, 2014

(86) PCT No.: PCT/JP2014/079580
§ 371 (c)(1),
(2) Date: Aug. 23, 2016

(87) PCT Pub. No.: WO2016/072015
PCT Pub. Date: May 12, 2016

(65) Prior Publication Data
US 2016/0357465 A1 Dec. 8, 2016

(51) Int. Cl.
*G06F 3/06* (2006.01)
(52) U.S. Cl.
CPC ............ *G06F 3/0619* (2013.01); *G06F 3/065* (2013.01); *G06F 3/0665* (2013.01); *G06F 3/0689* (2013.01)
(58) Field of Classification Search
None
See application file for complete search history.

(56) References Cited

U.S. PATENT DOCUMENTS

2006/0277376 A1 12/2006 Watanabe et al.
2008/0229039 A1* 9/2008 Maki .................... G06F 11/006
711/162

(Continued)

FOREIGN PATENT DOCUMENTS

JP 2006-338250 A 12/2006
JP 2008-305288 A 12/2008
(Continued)

OTHER PUBLICATIONS

International Search Report of PCT/JP2014/079580 dated Feb. 10, 2015.

*Primary Examiner* — Denise Tran
(74) *Attorney, Agent, or Firm* — Mattingly & Malur, PC

(57) ABSTRACT

[Object] Copy processing time is reduced by selecting an optimum copy method according to the content of difference data and the status of a system.
[Solution] When the primary disk storage apparatus and the secondary disk storage apparatus are separated from each other after dual writing operation and a copy pair regarding which data is written to only the primary disk storage apparatus is to be resynchronized, the host computer selects either host-computer-based copy processing executed via the host computer or inter-disk-control-device copy processing executed between the first disk control device and the second disk control device, on the basis of information about copy processing including a difference data amount between the primary disk storage apparatus and the secondary disk storage apparatus, a data transfer amount between the respective apparatuses, and performance information of each apparatus.

9 Claims, 9 Drawing Sheets

(56) References Cited

U.S. PATENT DOCUMENTS

| | | |
|---|---|---|
| 2008/0307120 A1 | 12/2008 | Ogawa et al. |
| 2009/0006794 A1 | 1/2009 | Mizuta et al. |
| 2009/0070528 A1 | 3/2009 | Barfai et al. |
| 2009/0222631 A1 | 9/2009 | Sugiura |
| 2011/0167235 A1 | 7/2011 | Inoue et al. |

FOREIGN PATENT DOCUMENTS

| | | |
|---|---|---|
| JP | 2009-009333 A | 1/2009 |
| JP | 2009-211132 A | 9/2009 |
| JP | 2012-128770 A | 7/2012 |
| WO | 2011/048641 A1 | 4/2011 |

\* cited by examiner

FIG.5

Copy Processing Time Management Table 121

| # | Copy Execution Day | Copy Start [Upper Row] / End [Lower Row] Time (Hour: Minute: Second) | Volume Serial Number | Cache Hit Rate (%) | Copy Method (Inter-DKC Copying or Host-based Copying) | User Option (0: None; 1: Host; 2: DKC) | Maximum Copy Time (sec) | Minimum Copy Time (sec) | Average Copy Time (sec) | Host's CPU Usage Rate (%) | DKC's Processor Usage Rate (%) |
|---|---|---|---|---|---|---|---|---|---|---|---|
| 1. | 20140814 | 17:00:00 / 17:01:50 | WDCP00 | 33 | Inter-DKC Copying | 0 | 110 | 110 | 105 | 85 | 60 |
| 2. | 20140814 | 17:00:01 / 17:18:21 | WDCP01 | 40 | Inter-DKC Copying | 0 | 1100 | 110 | 605 | 90 | 75 |
| : | : | : | : | : | : | : | : | : | : | : | : |
| 5. | 20140815 | 04:30:10 / 04:31:50 | WDCP07 | 100 | Host-based Copying | 1 | 1100 | 100 | 330 | 40 | 80 |

Dual Writing Pair Control Table 122

| # | Configuration of Primary and Secondary Apparatuses (Pair) | | | | Connected Equipment Information (Primary Apparatus [Top Right], Secondary Apparatus [Bottom Right]) | | Status of Use of Primary and Secondary Apparatuses (Pair) | | |
|---|---|---|---|---|---|---|---|---|---|
| | Primary Apparatus (Device Symbol Name [Top], Device Address [Bottom]) | Secondary Apparatus (Device Symbol Name [Top], Device Address [Bottom]) | Volume Serial Number | Device Type (6587, 8598) | Computer (Host) | DKC | Primary Apparatus Update (*) (1: Updating; 0: Not Updating) | Pair Copying State (0: Not Copying; 1: Differential Copying; 2: Full Copying) | Primary Apparatus Cache Resident Data (1: Cache Resident Data; 0: Non-resident Data) |
| 1. | 180 (13C0) | 181 (14C0) | WDCP00 | 6587 | Host | DKC1 / DKC2 | 0 | 1 | 0 |
| 2. | 182 (13C1) | 183 (14C1) | WDCP01 | 6587 | Host | DKC1 / DKC2 | 0 | 2 | 0 |
| ... | | | | | | | | | |
| 5. | 190 (13D0) | 191 (14D1) | WDCP07 | 6587 | Host | DKC1 / DKC2 | 1 | 1 | 1 |
| | 1221 | 1222 | 1223 | 1224 | 1225 | 1226 | 1227 | 1228 | 1229 |

Transfer Amount Management Table

| # | Volume Serial Number | Difference Amount (MB) | Inter-channel Transfer Amount between Host and DKC (MB/sec) | Transfer Amount between DKCs (MB/sec) | Estimated End Time of Copy Processing by Host (sec) | Estimated End Time of Copy Processing by DKC (sec) |
|---|---|---|---|---|---|---|
| 1. | WDCP00 | 300 | 4.7 | 5.2 | 63.8 | 57.7 |
| 2. | WDCP01 | 3000 | 4.8 | 5.2 | — (Not applicable to full copying) | — (Not applicable to full copying) |
| | : | : | : | : | : | : |
| 5. | WDCP07 | 300 | 5.0 | 5.1 | 60 | 58.8 |

1230  1231  1232  1233  1234  1235  1236

123

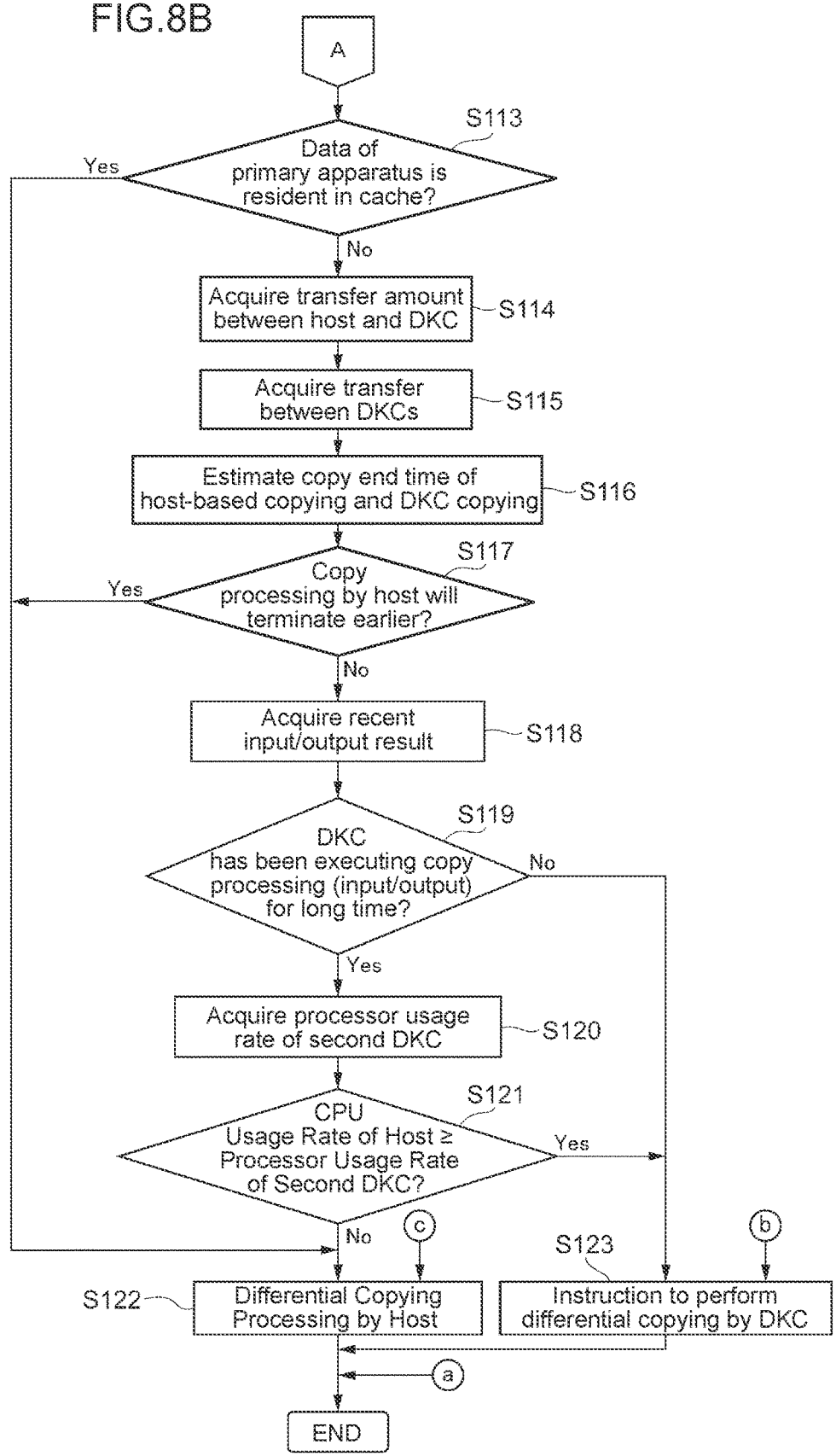

COPY PROCESSING MANAGEMENT SYSTEM AND COPY PROCESSING MANAGEMENT METHOD

TECHNICAL FIELD

The present invention relates to a copy processing management system and a copy processing management method and is suited for use in a copy processing management system and copy processing management method for reducing copy processing time for dual writing operation on primary and secondary apparatuses.

BACKGROUND ART

In recent years, a data amount such as big data handled by various business systems tends to increase. Along with the increase of the data amount, time for batch processing executed after the close of business such as banking services also increases. So, there is a disclosed technique that reduces batch processing time by changing a file placement pattern according to processing time of the batch processing when executing a batch job (for example, PTL 1).

Furthermore, in some case, dual writing operation is executed on a primary disk storage apparatus and a secondary disk storage apparatus (the primary disk storage apparatus may be hereinafter sometimes referred to as the primary apparatus, the secondary disk storage apparatus may be hereinafter sometimes referred to as the secondary apparatus, and the primary disk storage apparatus and the secondary disk storage apparatus may be hereinafter sometimes referred to as the primary and secondary apparatuses) in order to secure data integrity. Normally, the dual writing operation on the primary and secondary apparatuses is executed during daytime business hours; and after the end of the business hours, the primary and secondary apparatuses are separated from each other, only the primary apparatus is made updatable and is used for online operations, and the secondary apparatus is made non-updatable and is used for batch operations to refer to data. Then, after the completion of the batch operations, copy processing is executed to copy update data of the primary apparatus as difference data to the secondary apparatus.

CITATION LIST

Patent Literature

PTL 1: Japanese Patent Application Laid-Open (Kokai) Publication No. 2012-128770

SUMMARY OF INVENTION

Problems to be Solved by the Invention

When the processing for copying the difference data is executed after the termination of the batch processing as described above, copy processing time still increases even if batch processing time is reduced by the above-mentioned PTL 1. Therefore, as a result, there remains a possibility that the copy processing may not be completed before business start time during the daytime and the fear of delaying the business start time during the daytime may not be avoided.

The present invention was devised in consideration of the above-described circumstances and aims at proposing a copy processing management system and copy processing management method capable of reducing the copy processing time by selecting an optimum copy method according to the content of the difference data and the status of the system.

Means for Solving the Problems

In order to solve the above-described problem, provided according to the present invention is a copy processing management system including: a first disk control device that manages a primary disk storage apparatus; a second disk control device that manages a secondary disk storage apparatus; and a host computer that synchronizes the primary disk storage apparatus with the secondary disk storage apparatus and manages them as a copy pair, wherein when the primary disk storage apparatus and the secondary disk storage apparatus are separated from each other after dual writing operation and the copy pair regarding which data is written to only the primary disk storage apparatus is to be resynchronized, the host computer selects either host-computer-based copy processing executed via the host computer or inter-disk-control-device copy processing executed between the first disk control device and the second disk control device, on the basis of information about copy processing.

In order to solve the above-described problem, provided according to the present invention is a copy processing management method for synchronizing a primary disk storage apparatus with a secondary disk storage apparatus and managing as a copy pair, wherein the copy processing management method includes: a step executed by a host computer synchronizing a first disk control device for managing the primary disk storage apparatus with a second disk control device for managing the secondary disk storage apparatus and managing the first disk control device and the second disk control device as a copy pair; a step executed by the host computer separating the primary disk storage apparatus from the secondary disk storage apparatus after dual writing operation and resynchronizing the copy pair regarding which data is written to only the primary disk storage apparatus; a step executed by the host computer acquiring information about copy processing; and a step executed by the host computer selecting either host-computer-based copy processing executed via the host computer or inter-disk-control-device copy processing executed between the first disk control device and the second disk control device, on the basis of the information about the copy processing.

Advantageous Effects of Invention

According to the present invention, the fear of obstructing business activities during the daytime can be avoided by reducing the copy processing time by selecting an optimum copy method according to the content of the difference data and the status of the system.

BRIEF DESCRIPTION OF DRAWINGS

FIG. 5 is a chart illustrating an example of a copy processing time management table according to the embodiment;

FIG. 6 is a chart illustrating an example of a dual writing pair control table according to the embodiment;

FIG. 7 is a chart illustrating an example of the transfer amount management table according to the embodiment;

FIG. 8B is a flowchart illustrating the details of the copy method determination processing according to the embodiment.

DESCRIPTION OF EMBODIMENTS

An embodiment of the present invention will be explained below in detail with reference to drawings.

(1) Outline of this Embodiment

Figure 1:
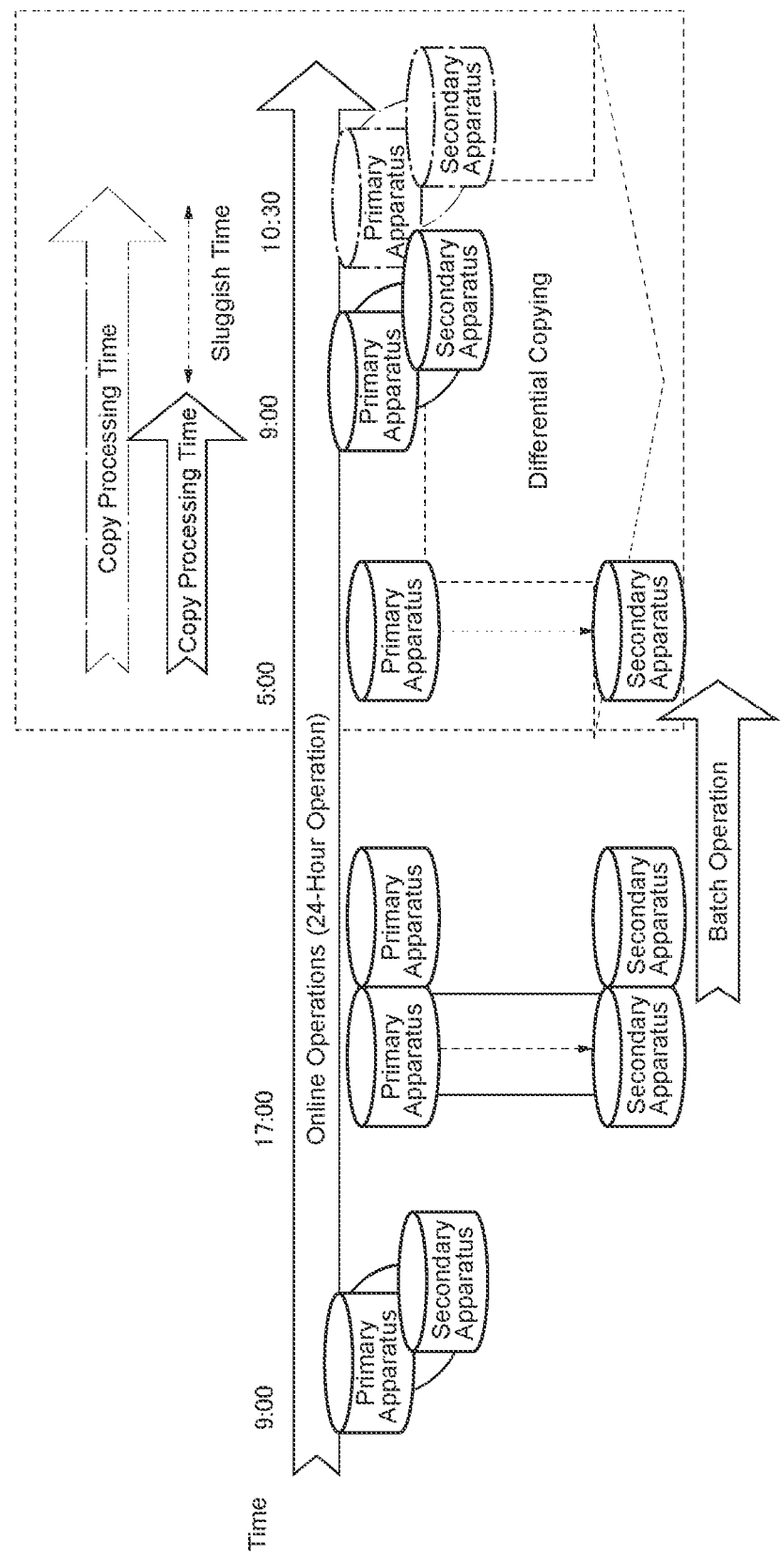
FIG. 1 is a conceptual diagram for explaining the outline of an embodiment of the present invention.

Firstly, the outline of this embodiment will be explained with reference to FIG. 1. A computer system according to this embodiment performs dual writing of data to two logical devices, that is, primary and secondary apparatuses, in order to secure data integrity. Normally, data is dually written to both the primary and secondary apparatuses during daytime business hours. For example, referring to FIG. 1, the system is in a dual writing state in which data is dually writing to the primary and secondary apparatuses at time from "9:00 to 17:00."

Furthermore, after the close of the business hours, the primary and secondary apparatuses are logically separated from each other while keeping the integrity of the primary and secondary apparatuses; and the primary apparatus is used for updatable online operations and the secondary apparatus is used for non-updatable batch operations. For example, referring to FIG. 1, the primary and secondary apparatuses are logically separated from each other at "17:00" while securing the integrity of the primary and secondary apparatuses; and the primary and secondary apparatuses remain in a separated state during a time period from "17:00 to 5:00." Therefore, during the time period from "17:00 to 5:00," the online operations can be made active and the batch operations on a data reference system such as backing-up can be also executed in parallel.

Then, after the completion of the batch operations, a difference data between the primary apparatus and the secondary apparatus, which has been generated by update processing on the primary apparatus, is copied to the secondary apparatus in order to restore the dual writing processing on the primary and secondary apparatuses again. For example, referring to FIG. 1, differential copying processing for reflecting update data generated at the primary apparatus as the difference data in the secondary apparatus is executed at and after "5:00."

When there are many apparatuses targeted for the copy processing of the difference data under this circumstance, long copy processing time is required. In this case, there is a possibility that the business start time during the daytime may be delayed, which might cause damage to the business. For example, if the differential copying processing for one copy pair of the primary and secondary apparatuses takes 20 seconds, the differential copying processing for 600 pairs of the primary and secondary apparatuses would take 200 minutes. Therefore, as shown in FIG. 1, when the copy processing should normally be completed before the business start time at "9:00," it is possible that the copy processing time may be completed after "9:00" because there are so many apparatuses targeted for the copy processing.

Accordingly, an attempt has been made to increase the speed of the copy processing by having the host computer acquire a difference map capable of perceiving updated parts of the primary apparatus and copy only the difference data from the primary apparatus to the secondary apparatus. However, the above-described problem has occurred such that as the number of target apparatuses which are copy targets increases and a backup data amount increases, CPU load on the host computer which executes the copy processing increases, thereby causing a delay in the copy processing. On the other hand, it is possible to use the disk control devices for controlling the primary and secondary apparatuses to execute the copy processing; however, when the disk control devices are executing, for example, update processing other than the differential copying processing, the copy processing may sometimes enter a standby state.

Therefore, it is an object of this embodiment to reduce the copy processing time by selecting an optimum copy method from either the copy processing via the host computer or the copy processing between the disk control devices in light of the status of loads on the host computer and the disk control devices and the data amount for the differential copying.

Specifically speaking, the host computer analyzes different parts of each of the primary and secondary apparatuses and the difference data amount by referring to difference map information, and selects the copy method and determines an operation mode of the copy processing in light of the analysis results of the difference data, CPU usage rates of the disk control devices, and processing performance of the disk control devices. For example, the copy processing is executed on apparatuses whose copy end time is earlier, on the basis of the difference data amount and the transfer amount; and when the load on the host computer is less than the load on the disk control devices, the host computer executes the copy processing; and when the host computer has no available CPU usage rate, the disk control devices execute the copy processing. As a result, the copy processing can be executed promptly by appropriately utilizing resources of the host computer and the disk control devices, while securing the integrity of the primary and secondary apparatuses.

(2) Configuration of Computer System (2-1) Hardware Configuration

Figure 2:
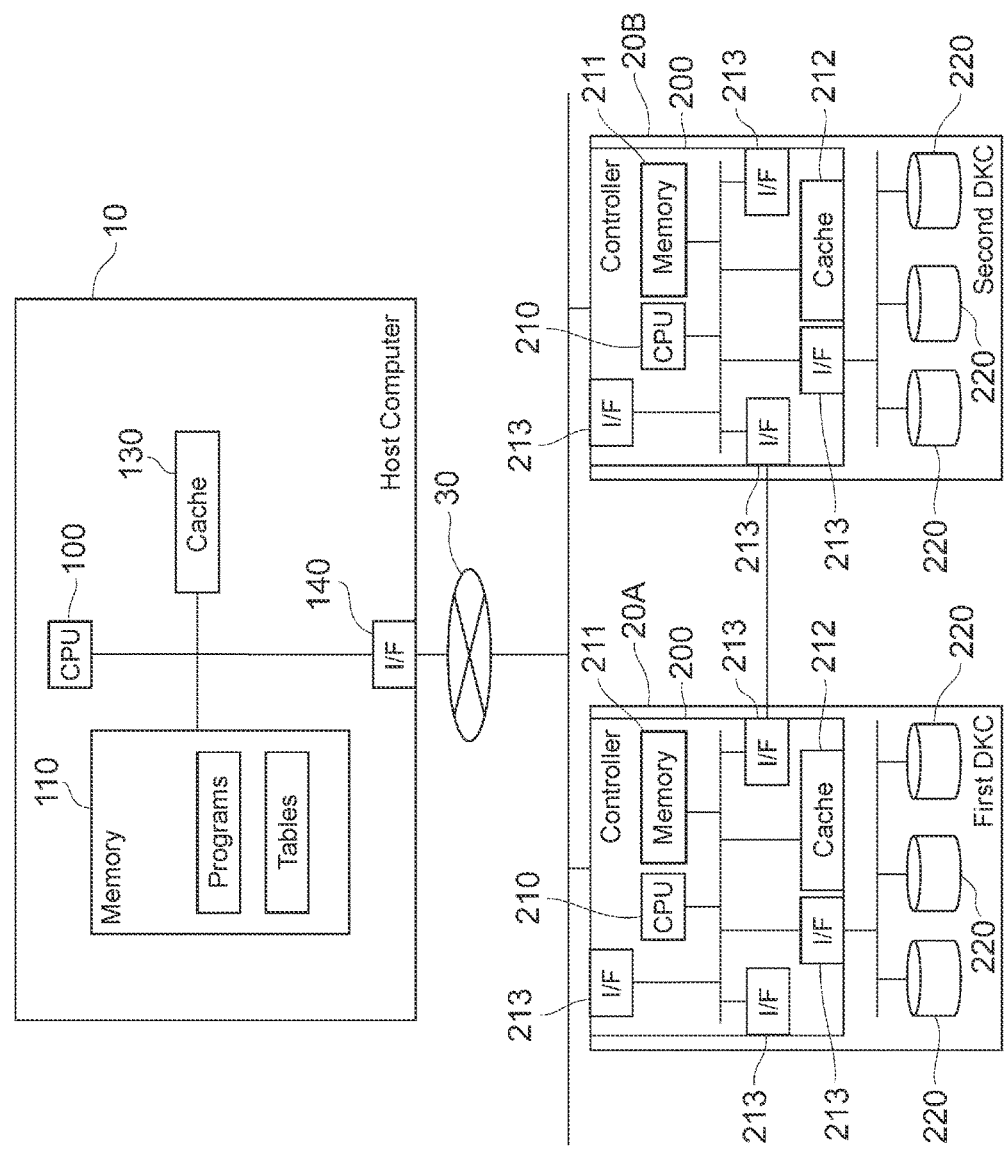
FIG. 2 is a block diagram illustrating a hardware configuration of a copy processing management system according to the embodiment.

Next, a hardware configuration of the copy processing management system will be explained with reference to FIG. 2. The copy processing management system is configured so that a host computer and a plurality of disk control devices are connected via a network. Specifically speaking, a host computer 10 and two disk control devices, that is, a first DKC 20A and a second DKC 20B, are connected via a network 30 as illustrated in FIG. 2. Referring to FIG. 2, two disk control devices are connected to the host computer 10; however, the invention is not limited to this example and a plurality of disk control devices may be connected to the host computer 10. Furthermore, the first DKC 20A and the second DKC 20B may sometimes hereinafter collectively referred to as the DKC(s) 20.

The host computer 10 is a computer system equipped with information processing resources such as a CPU (Central Processing Unit) 100, a memory 110, a cache 130, and storage areas such as disks (not shown), as well as information input-output devices such as a keyboard, mouse, monitor display, speaker, and communications interface cards, and is composed of, for example, a personal computer, workstation, or mainframe.

The CPU 100 functions as a processing unit and controls the operation of the entire host computer 10 according to various programs and operation parameters stored in the memory 110. Furthermore, the memory 110 also stores various tables in addition to the various programs and is composed of ROMs (Read Only Memories) and RAMs (Random Access Memories).

The cache 130 temporarily stores data written to the DKCs 20 and data read from the DKCs 20. Furthermore, an interface (indicated as I/F in the drawing) 140 is an interface connected to external equipment and is a connection port connected to the external equipment which is capable of transmitting data and is to be connected to a network such as a LAN (Local Area Network).

The DKC 20 is a disk control device including a controller 200 for controlling storage of data in a plurality of physical storage media. The physical storage media are, for example, disk-type storage media (such as HDDs (Hard Disk Drives)). Furthermore, examples of the disk-type storage media can include FC (Fibre Channel), SAS (Serial Attached SCSI), ATA (Advanced Technology Attachment), and SATA (Serial ATA) drives. Furthermore, the physical storage media may be other types of physical storage media such as SSDs (Solid State Drives) or semiconductor memory storage devices/boards instead of the disk-type storage media.

Furthermore, the DKC 20 also includes, for example, a CPU 210, a memory 211, an interface (indicated as I/F in the drawing) 213, and a cache 212. The CPU 210 functions as a processing unit and a control unit and controls the operation of the entire DKC 20 according to various programs stored in the memory 211.

The memory 211 stores, for example, programs and operation parameters used by the CPU 210 and is composed of ROMs, RAMs, and so on. Furthermore, the cache 212 temporarily stores data written to disks 220 and data read from the disks 220. Furthermore, the plurality of disks 220 are managed as one RAID (Redundant Arrays of Inexpensive Disks) group and part of areas of the RAID group is provided as one or more logical volumes.

Furthermore, in this embodiment, a logical volume managed by the first DKC 20A is defined as a primary disk storage apparatus (primary apparatus) and a logical volume managed by the second DKC 20B is defined as a secondary disk storage apparatus (secondary apparatus). Then, in response to a request from the host computer 10, the logical volume (the primary apparatus) of the first DKC 20A and the logical volume (the secondary apparatus) of the second DKC 20B are set as a copy pair.

During the daytime business hours, data is written to both the primary apparatus and the secondary apparatus which constitute the copy pair as mentioned earlier. Then, after the close of the business hours, the primary apparatus and the secondary apparatus which constitute the copy pair are logically separated from each other and then the primary apparatus of the first DKC 20A is made to be updatable and is used for online operations and the secondary apparatus of the second DKC 20B is made to be non-updatable and is used for batch operations to refer to data. After the termination of the batch operations, the difference data between the primary apparatus and the secondary apparatus, which has been generated by the update processing on the primary apparatus, is copied to the secondary apparatus. After the completion of the differential copying, the dual writing processing on the primary and secondary apparatuses is resumed.

Incidentally, the processing for copying the difference data between the primary apparatus of the first DKC 20A and the primary apparatus of the second DKC 20B is executed on the above-described logical volume basis. The processing for copying the difference data, which is executed on the logical volume basis, will be explained later in detail.

(2-2) Functional Configuration of Host Computer

Figure 3:
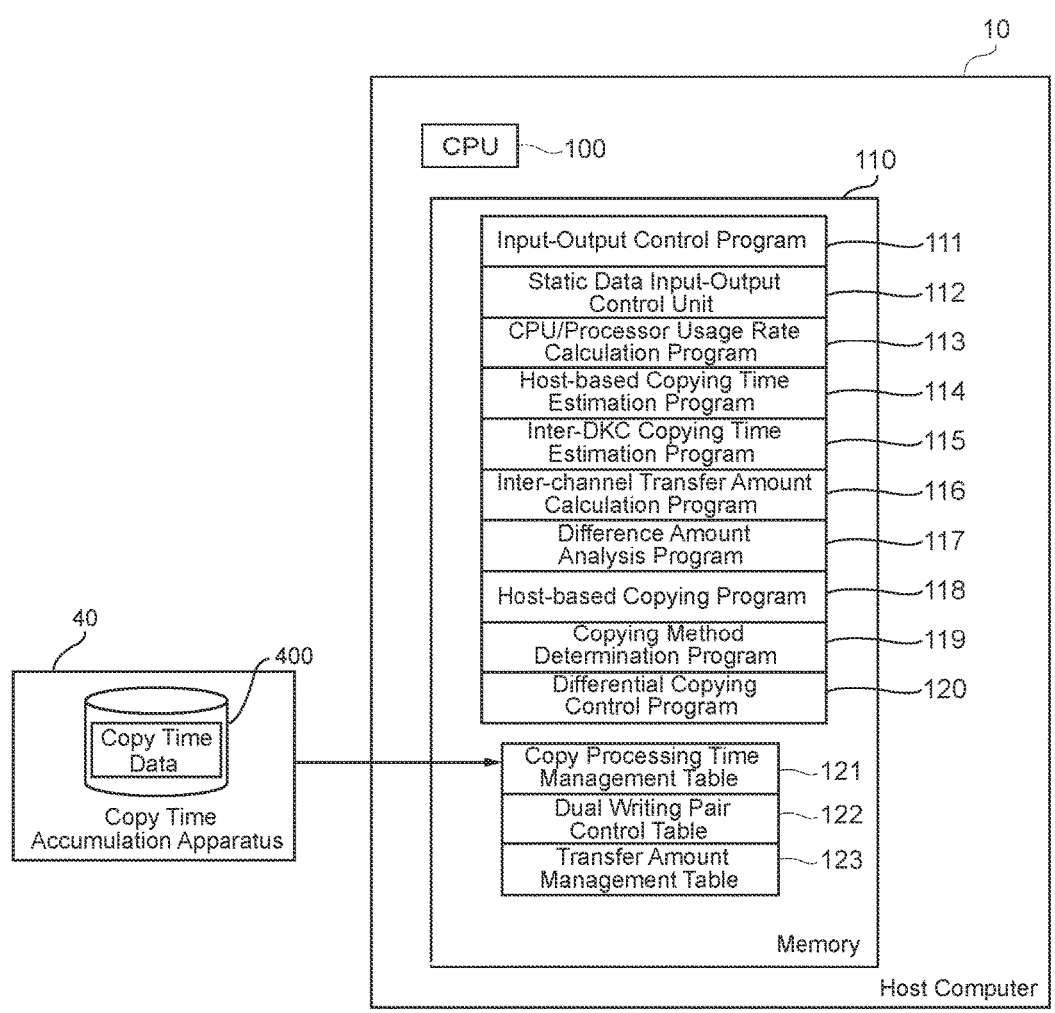
FIG. 3 is a block diagram illustrating a functional configuration of a host computer according to the embodiment.

Next, a functional configuration of the host computer 10 will be explained with reference to FIG. 3. Referring to FIG. 3, the memory 110 for the host computer 10 stores, as programs for executing the copy processing according to this embodiment, an input-output control program 111, a static data input-output control unit 112, a CPU/processor usage rate calculation program 113, a host-based copying time estimation program 114, an inter-DKC copying time estimation program 115, an inter-channel transfer amount calculation program 116, a difference amount analysis program 117, a host-based copying program 118, a copying method determination program 119, and a differential copying control program 120.

The input-output control program 111 is a program for controlling input-output requests between the host computer 10 and the DKCs 20. The input-output control program 111 cooperates with the static data input-output control unit described later to suppress input-output processing on the secondary apparatus which is separated from the dual writing pair. Furthermore, when performing copying by using the functions of the DKCs 20, the input-output control program 111 issues a copy pair setting request to the DKCs 20.

The static data input-output control unit 112 is a program that cooperates with the above-mentioned input-output control program 111 to control the input-output requests between the host computer 10 and the DKCs 20. Specifically speaking, when an update request is issued to the secondary apparatus in the logically separated state, the static data input-output control unit 112 is a program that suppresses this update request. Furthermore, during the copy processing for restoring the primary and secondary apparatuses as the dual writing pair, the static data input-output control unit 112 also blocks issuance of any input-output request to the secondary apparatus which is being updated.

The CPU/processor usage rate calculation program 113 is a program that calculates the CPU usage rate of the host computer 10 and provides the calculation result to the differential copying control program described later. Furthermore, the CPU/processor usage rate calculation program 113 also has a function acquiring the processor usage rates of the DKCs 20 and provides the processor usage rates of the DKCs 20 together with the CPU usage rate of the host computer 10 to the copying method determination program 119 described later.

The host-based copying time estimation program 114 is a program that estimates end time of the copy processing via the host computer 10. Specifically speaking, the host-based copying time estimation program 114 calculates the end time of the copy processing via the host computer 10 by dividing the "difference amount" analyzed by the difference amount analysis program 117 described later by the transfer amount (in seconds) between the host computer 10 and the DKC 20, which is calculated by the inter-channel transfer amount calculation program 116 described later.

The inter-DKC copying time estimation program 115 is a program that estimates end time of the copy processing between the DKCs 20. Specifically speaking, the inter-DKC copying time estimation program 115 calculates the end time of the copy processing between the DKCs 20 by dividing the "difference amount" analyzed by the difference amount analysis program 117 described later by the transfer amount (in seconds) between the DKCs 20, which is calculated by the inter-channel transfer amount calculation program 116 described later.

The inter-channel transfer amount calculation program 116 is a program that calculates an inter-channel transfer amount by regularly (on the second time scale) monitoring a data amount delivered between the host computer 10 and the DKC 20 and between the DKCs 20. The calculated transfer amount is saved in the transfer amount management table 123 described later and copy processing time can be estimated by dividing the difference amount of update data by the transfer amount.

The difference amount analysis program 117 is a program that calculates the difference amount of data between the primary apparatus and the secondary apparatus by analyzing the difference map acquired from the DKC 20.

The host-based copying program 118 is a program that executes the copy processing via the host computer 10. The DKC 20 maps updated parts of the primary apparatus to the difference map on a cylinder basis (on a logical volume basis) when and after the primary and secondary apparatuses are logically separated from each other. The host computer 10 analyzes this difference map and executes differential copying to cylinder(s) with differences. Then, the dual writing state of the primary and secondary apparatuses is restored with respect to the cylinder(s) on which the execution of the differential copying has been completed.

The copying method determination program 119 is a program that determines an optimum copy method on the basis of information such as the content of the difference data collected by the differential copying control program 120 described later, resident data in the cache, and estimated time of the copy processing time.

The differential copying control program 120 compares the estimation results of the copy end time calculated by the host-based copying time estimation program 114 and the inter-DKC copying time estimation program 115 as described above, acquires the CPU usage rate of the host computer 10 and operation information of the DKCs 20, and checks whether data of the primary apparatus is resident in the cache. Furthermore, when copying between the DKCs 20 is performed, the differential copying control program 120 receives a copy completion notice from the DKCs 20 and restores the primary and secondary apparatuses to make them enter the dual writing state. Specifically speaking, the differential copying control program 120 updates pair information of a pair of the primary and secondary apparatuses, on which the differential copying has been completed, to a "state capable of dual writing" in the dual writing pair control table 122.

Furthermore, the memory 110 stores a copy processing time management table 121, a dual writing pair control table 122, and a transfer amount management table 123 as tables to which each of the above-described programs refers and writes data when the relevant program executes the copy processing. Referring to FIG. 3, actual records of the copy time for the differential copying are accumulated as copy time data 400 in a copy time accumulation apparatus 40; however, the copy time data 400 may be accumulated in the host computer 10. The various tables will be explained later in detail.

(2-3) Details of Copy Processing

Next, the details of the copy processing on the primary and secondary apparatuses of the DKCs 20 will be explained, In this embodiment, when batch processing executed daily or monthly terminates, the host computer 10 is notified of the termination of the business. Then, the host computer 10 restores the dual writing state of a pair of the primary and secondary apparatuses which were logically separated from each other before executing the batch processing. Specifically speaking, in the state where the primary and secondary apparatuses are separated from each other, processing for copying the difference data, which has been generated by the update processing on the primary apparatus, from the first DKC 20A to the second DKC 20B is started. This processing is executed under control of the differential copying control program 120 of the host computer 10 and is also referred to as copy pair resynchronization processing.

The differential copying control program 120 issues a difference map reading request to the first DKC 20A via the input-output control program 111. Incidentally, the second DKC 20B only has to acquire the difference map of the first DKC 20A in order to utilize it for reference system activities. The differential copying control program 120 selects the optimum copy method together with the CPU usage rate and other conditions by analyzing the difference map. Furthermore, when there is no difference between the primary and secondary apparatuses and copying is unnecessary, the differential copying control program 120 immediately restores the dual writing state of the primary and secondary apparatuses.

Figure 4:
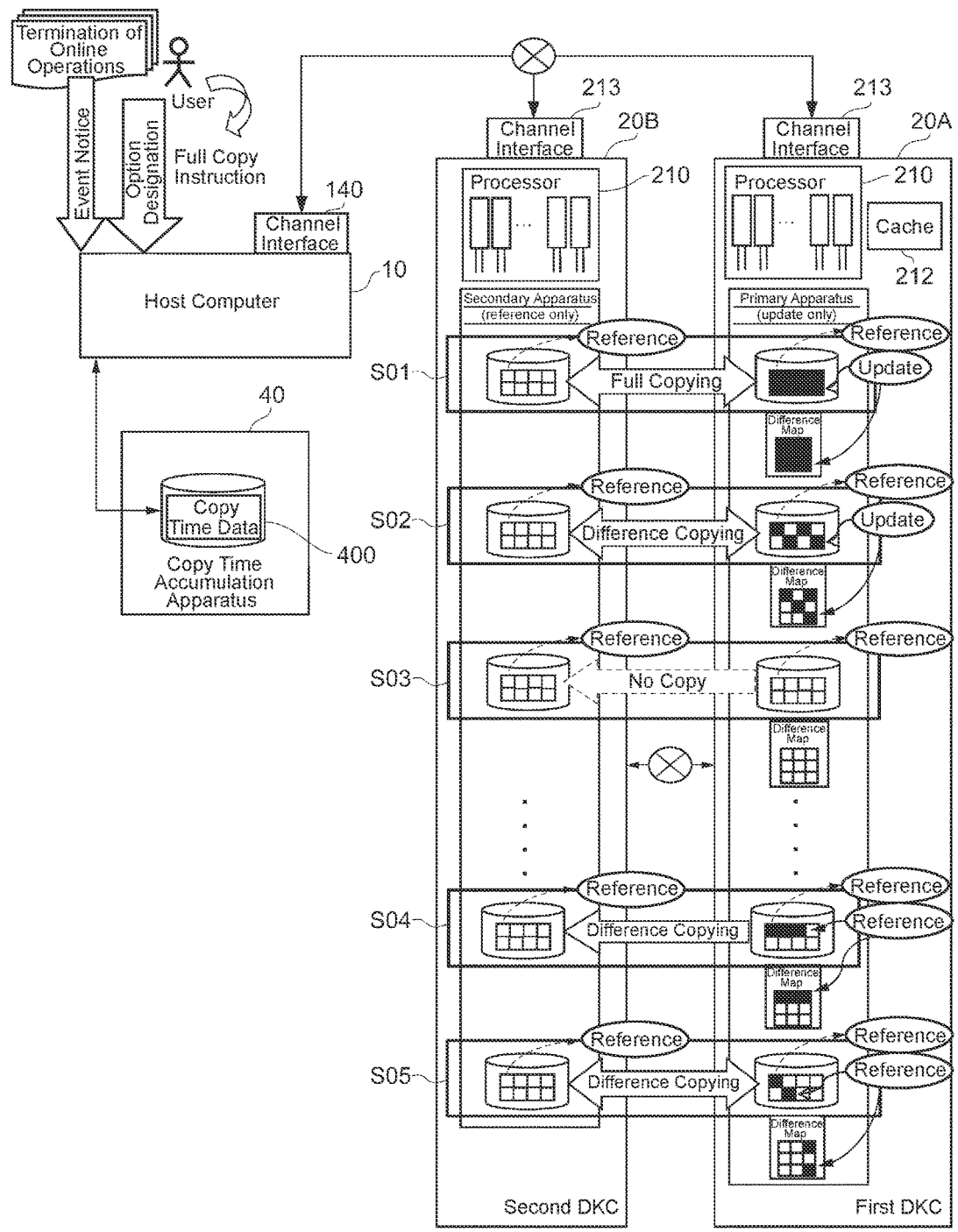
FIG. 4 is a conceptual diagram for explaining the details of copy processing according to the embodiment.

The details of the copy processing will be explained with reference to FIG. 4. The copy processing in step S01 indicates full copying of the primary and secondary apparatuses. The full copying of the primary and secondary apparatuses is executed when the user gives an instruction of full copying or when all pieces of data of the primary apparatus have been updated; and the full copying is performed by using a function copying data between the DKCs 20.

The copy processing in step S02 indicates differential copying between the DKCs 20. When the CPU usage rate of the host computer 10 exceeds a specified value, the differential copying is executed between the DKCs 20. Incidentally, the specified value herein used means a specified value designated by the user or, for example, a state where the CPU usage rate of the host computer 10 is 80% or more.

Step S03 is a case where the primary apparatus has not been updated and no difference data is detected. In this case, the copy processing is not executed and the dual writing state is immediately restored and the primary and secondary apparatuses are used.

Step S04 indicates differential copying by the host computer 10. The host computer 10 executes the differential copying, for example, when the primary apparatus is being updated, when the copy processing time of the DKCs 20 increases and a specified load or more is imposed on the DKCs 20, and when data of the primary apparatus which is a copy target is resident in the cache for the host computer 10.

When the differential copying is executed via the host computer 10 while the primary apparatus is being updated, the dual writing state can be immediately restored with respect to a cylinder(s) on which the execution of the copy processing has been completed. Therefore, redundancy of the DKCs 20 can be enhanced early.

Regarding whether the specified load or more is imposed on the DKCs 20 or not, an increase of the copy processing time is monitored by the DKCs 20 by accumulating the copy processing time at the host computer 10. When the copy processing time of the DKCs 20 increases by a specified amount or more, the differential copying is executed by the host computer 10. Furthermore, when the number of pairs on which the copy processing is executed by using functions of the DKCs 20 increases, multiplicity of the copy processing increases and the processor usage rates of the DKCs 20 increase. Also in this case, loads on the DKCs 20 can be distributed by executing the differential copying via the host computer 10.

Furthermore, when the data of the primary apparatus which is the copy target is resident in the cache for the host computer 10, an input-output response is superior to access via the drives, so that the copy processing can terminate earlier by executing the copy processing via the host computer 10 rather than the copy processing between the DKCs 20. Furthermore, when the time elapsed after update of the primary apparatus is shorter, there is a higher possibility for the data to remain in the cache for the host computer 10. Therefore, when the copy processing is executed immediately after the update of the primary apparatus, a high cache hit rate can be expected.

Step S05 indicates a case where the copy processing between the DKCs 20 is executed as a result of determining whether copying via the host computer 10 or copying between the DKCs 20 should be executed, according to the estimated end time of the differential copying. The estimated end time of the differential copying can be calculated by dividing the difference amount of data as obtained from the analysis results of the difference map by the inter-channel transfer amount between the host computer 10 and the DKC 20 or the transfer amount between the DKCs 20 as described earlier. Then, a copy method whose calculated processing time of the copy processing is shorter is selected.

Incidentally, when executing the differential copying via the host computer 10 as indicated in step S04, the aforementioned host-based copying program 118 executes the copy processing. Furthermore, when executing the differential copying or the full copying between the DKCs 20 as indicated in step S02 or step S05, the differential copying control program 120 acquires information about the copy status of the pair of the primary and secondary apparatuses and regularly monitors the copy status of the pair. Then, after the completion of the copy processing is reported from the DKCs 20 to the host computer 10, the primary and secondary apparatuses which are copy targets of the DKCs 20 are made to transit to the state capable of dual writing by updating pair information in the dual writing pair control table 122.

(2-4) Various Tables

Next, the details of various tables stored in the memory 110 for the host computer 10 will be explained with reference to FIG. 5 to FIG. 7.

FIG. 5 is a chart illustrating an example of the copy processing time management table 121. The copy processing time management table 121 is a table for accumulating copy processing completion time and managing, for example, maximum, minimum, and average times of the copy processing time.

Referring to FIG. 5, the copy processing time management table 121 is composed of an item number column 1210, a copy execution day column 1211, a copy start/end time column 1212, a volume serial number column 1213, a cache hit rate column 1214, a copy method column 1215, a user option column 1216, a maximum copy time column 1217, a minimum copy time column 1218, an average copy time column 1219, a host's CPU usage rate column 1220, and a DKC's processor usage rate column 1221.

The item number column 1210 stores a serial number. The copy execution day column 1211 stores a date and time when copying was executed. The copy start/end time column 1212 stores copy start time and end time. The volume serial number column 1213 stores a serial number of a copy target volume. The cache hit rate column 1214 stores a cache hit rate, that is, probability of storage of target data in the cache for the host computer 10.

The copy method column 1215 stores a copy method selected from either copying via the host computer 10 (host-based copying) or copying between the DKCs 20 (inter-DKC copying). The user option column 1216 stores a copy method designated by the user. The maximum copy time column 1217 stores maximum time of the copy time; the minimum copy time column 1218 stores minimum time of the copy time; and the average copy time column 1219 stores average time of the copy time. The host's CPU usage rate column 1220 stores a CPU usage rate of the host computer 10; and the DKC's processor usage rate column 1221 stores the processor usage rate of the DKC 20.

For example, FIG. 5 shows that "inter-DKC copying" of a volume with the volume serial number "WDCP01" was executed at "17:00:01 to 17:18:21" on "Aug. 14, 2014"; and upon such copy processing, the cache hit rate was "40%," the Maximum copy time was "1100 sec," the minimum copy time was "100 sec," the average copy time was "605 sec" the host's CPU usage rate was "90%," and the processor usage rate of the DKC 20 was "80%." Furthermore, it is also shown that since the user option is "0" with respect to the relevant volume, whether copying by the host computer 10 or the DKCs 20 is not designated by the user. For example, it is shown that regarding a volume with the item number "5" and the volume serial number "WDCP07," the user option is "1," so that copying via the host computer 10 is designated by the user.

FIG. 6 is a chart illustrating an example of the dual writing pair control table 122. The dual writing pair control table 122 is a table for managing a dual writing pair device configuration and a copy pair status such as whether the differential copying is full copying or not or whether this is in a copying state or not.

Referring to FIG. 6, the dual writing pair control table 122 is composed of an item number column 1220, primary and secondary apparatuses configuration columns 1221 to 1224, connected equipment information columns 1225 and 1226, and primary and secondary apparatuses use status columns 1227 to 1229.

The item number column 1220 stores the serial number. The primary and secondary apparatuses configuration columns 1221 to 1224 store, for example, symbol names, addresses, volume serial numbers, and device types of the primary apparatus and the secondary apparatus. The connected equipment information column 1225 and 1226 store information about the host computer 10 to be connected, and the DKCs 20 for controlling the primary and secondary apparatuses. The primary and secondary apparatuses use status columns 1227 to 1229 store information indicating whether the primary apparatus is being updated, whether the pair is in a copying state, and whether data of the primary apparatus is resident in the cache or not.

For example, regarding a pair of the primary and secondary apparatuses for a volume with the volume serial number "WDCP00," FIG. 6 shows that the device symbol name of the primary apparatus is "180" and its device address is "13C0," while the device symbol name of the secondary apparatus is "181" and its device address is "14C0." It is also shown that the relevant volume is connected to the host computer "host," the primary apparatus is connected to "DKC1," and the secondary apparatus is connected to "DKC2." Furthermore, it is shown that according to the use status of the primary and secondary apparatuses, the primary apparatus is not being updated, but is in a state of differential copying and data of the primary apparatus is not resident in the cache.

FIG. 7 is a chart illustrating an example of the transfer amount management table 123. The transfer amount management table 123 is a table for managing the different amount and the channel transfer amount of the primary and secondary apparatuses. Referring to FIG. 7, the transfer amount management table 123 is composed of an item number column 1230, a volume serial number column 1231, a difference amount column 1232, an inter-channel transfer amount column 1233 between the host and the DKC, an inter-DKC transfer amount column 1234, an estimated end time column 1235 of copy processing by the host, and an estimated end time column 1236 of copy processing by the DKCs.

The item number column 1230 stores a serial number. The volume serial number column 1231 stores a serial number of a copy target volume. The difference amount column 1232 stores the difference data amount of the primary and secondary apparatuses. The inter-channel transfer amount column 1233 between the host and the DKC stores the inter-channel transfer amount between the host computer 10 and the DKC 20. The inter-DKC transfer amount column 1234 stores the transfer amount between the DKCs 20, that is, the first DKC 20A and the second DKC 20B. The estimated end time column 1235 of copy processing by the host stores the estimated end time when the copy processing is executed via the host computer 10. The estimated end time column 1236 of copy processing by the DKCs stores the estimated end time when the copy processing is executed by the DKCs 20.

For example, FIG. 7 shows that the difference amount of the primary and secondary apparatuses for the volume serial number "WDCP00" is "300 MB," the inter-channel transfer amount between the host and the DKC is "4.7 MB/sec," and the transfer amount between the DKCs is "5.2 MB/sec." Furthermore, regarding differential copying of the relevant volume, it is shown that the estimated end time of the copy processing by the host is "63.8 sec" and the estimated end time of the copy processing by the DKCs is "57.7 sec."

The estimated end time of the copy processing via the host computer 10 is calculated according to the following expression.

Difference Amount (MB)/Inter-channel Transfer Amount (MB/sec) between Host and DKC=Estimated Copy End Time (sec)  (Expression 1)

According to the above-mentioned Expression 1, the estimated copy end time of the volume "WDCP00" via the host computer 10 can be estimated as follows:

300 (MB)/5 (MB/sec)=60 (sec)

Furthermore, the estimated end time of the copy processing by the DKCs can be calculated according the following expression.

Difference Amount (MB)/Transfer Amount (MB/sec) between DKCs=Estimated Copy End Time (sec)(Expression 2)

According to the above-mentioned Expression 1, the estimated copy end time of the volume "WDCP00" can be estimated as follows:

300 (MB)/6 (MB/sec)=50 (sec)

In this embodiment, the estimated copy end time is calculated on the basis of the difference amount and the transfer amount as described above: and when there is no designation by the user, a copying method whose estimated copy end time is earlier can be selected from either copying via the host computer 10 or copying between the DKCs 20.

(3) Details of Copy Method Determination Processing

Next, the details of copy method determination processing executed by the host computer 10 will be explained with reference to FIG. 8A and FIG. 8B. Incidentally, in the following description, a processing subject of each processing will be explained as a "program"; however, it is a matter of course that the CPU 100 for the host computer 10 actually executes the processing according to the relevant program.

Figure 8A:
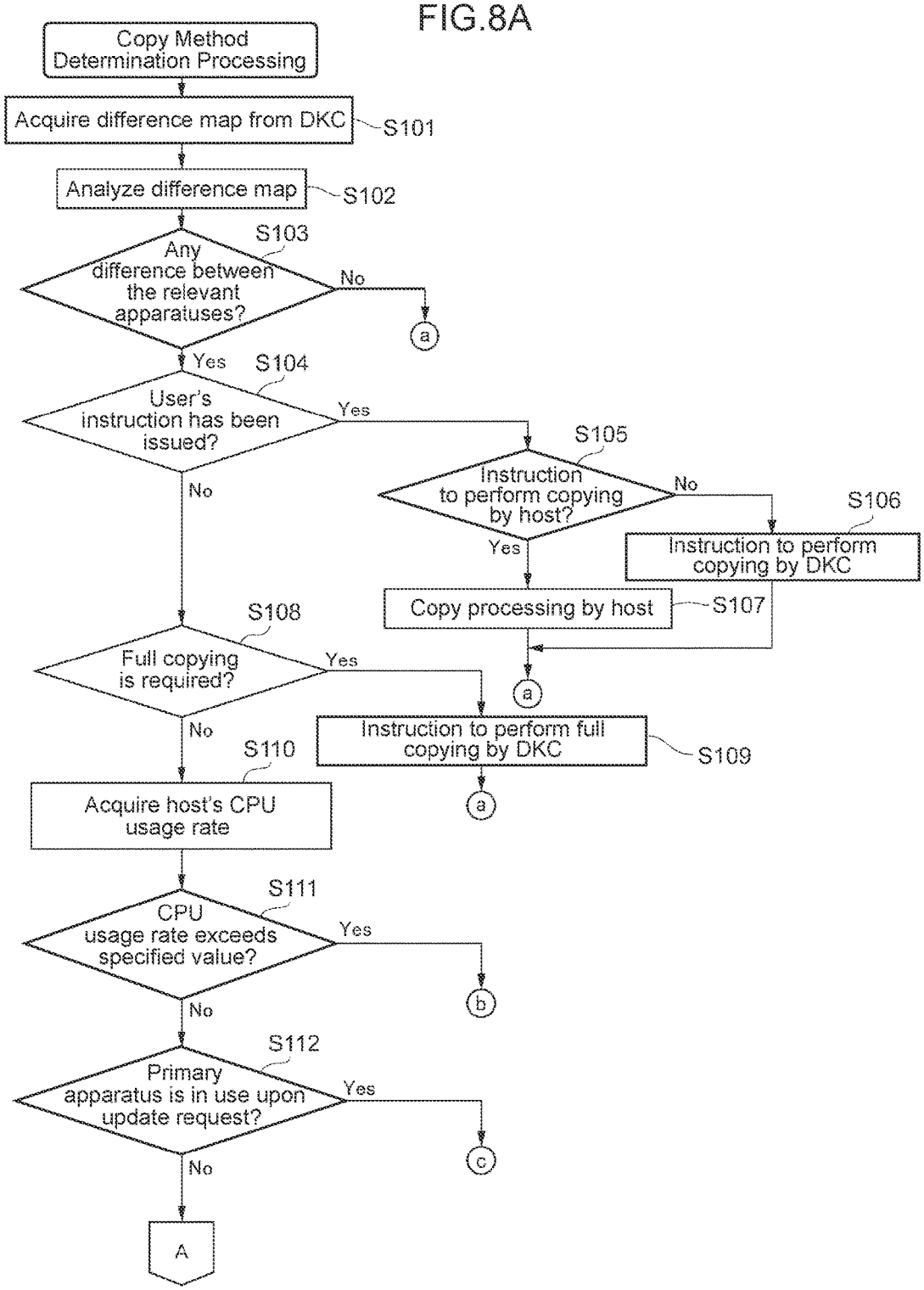
FIG. 8A is a flowchart illustrating the details of copy method determination processing according to the embodiment.

Referring to FIG. 8A, the difference amount analysis program 117 firstly acquires a difference map from the first DKC 20A (S101) and analyzes the acquired difference map (S102). The difference amount analysis program 117 stores the difference amount of the primary and secondary apparatuses, which is obtained as a result of the analysis in step S102, in the transfer amount management table 123.

Then, the copying method determination program 119 judges whether there is any difference between the primary and secondary apparatuses which are targets (S103). Specifically speaking, the copying method determination program 119 refers to the difference amount of the primary and secondary apparatuses in the transfer amount management table 123 and thereby checks the difference between the relevant primary and secondary apparatuses.

When it is determined in step S103 that there is no difference between the primary and secondary apparatuses, the copying method determination program 119 determines that differential copying is unnecessary, thereby terminating the processing.

On the other hand, when it is determined in step S103 that there is some difference between the primary and secondary apparatuses, the copying method determination program 119 judges whether a copy method is designated by the user or not (S104). Specifically speaking, the copying method determination program 119 checks whether the copy method is designated by the user or not, by referring to the user option in the copy processing time management table 121. Then, when the user option is "0: None," the copying method determination program 119 determines that there is no user designation. Furthermore, when the user option is either "1: host" or "2: DKC," the copying method determination program 119 determines that there is the user designation.

When it is determined in step S104 that there is the user designation, the copying method determination program 119 judges whether the user designates copying via the host computer 10 or not (S105). When it is determined in step S105 that the user designates copying via the host computer 10, the copying method determination program 119 executes the copy processing via the host computer 10 (S107). On the other hand, when it is determined in step S105 that the user designates the copying between the DKCs 20, the copying method determination program 119 issues an instruction to the DKCs 20 to execute the copy processing (S106).

When it is determined in step S104 that there is no user designation, the copying method determination program 119 judges whether full copying is required or not (S108). Specifically speaking, when the copying method determination program 119 refers to the transfer amount management table 123 and this is equal to the difference amount, the copying method determination program 119 determines that full copying is required.

When it is determined in step S108 that full copying is required, the copying method determination program 119 issues an instruction to the DKC 20s to execute the full copying (S109).

On the other hand, when it is determined in step S108 that the full copying is not required, the copying method determination program 119 acquires the CPU usage rate of the host computer 10 (S110). Specifically speaking, the copying method determination program 119 acquires the host's CPU usage rate by referring to the copy processing time management table 121.

Then, the copying method determination program 119 judges whether the CPU usage rate of the host computer 10 acquired in step S110 exceeds a specified value or not (S111). Under this circumstance, regarding the specified value, for example, whether the CPU usage rate of the host computer 10 exceeds 80% or not is judged. This preset value may be a value designated by the user.

When it is determined in step S111 that the CPU usage rate of the host computer 10 exceeds the specified value, the copying method determination program 119 issues an instruction to the DKCs 20 to execute the differential copying (S123).

On the other hand, when it is determined in step S111 that the CPU usage rate of the host computer 10 does not exceed the specified value, the copying method determination program 119 judges whether the primary apparatus which is the copy target is being used in response to an update request or not (S112). Specifically speaking, the copying method determination program 119 checks whether an updating flag of the primary apparatus is "1" or not, by referring to the dual writing pair control table 122. When the updating flag of the primary apparatus is "1," this means that an input-output request issued from, for example, the online operations to the primary apparatus is being executed.

When it is determined in step S112 that the primary apparatus is being used in response to the update request, the copying method determination program 119 executes the copy processing by the host computer 10 (S122).

On the other hand, when it is determined in step S112 that the primary apparatus is not being used in response to the update request, the copying method determination program 119 judges whether data of the primary apparatus is resident in the cache 130 for the host computer 10 or not (S113). Specifically speaking, the copying method determination program 119 checks whether a flag indicating whether the data of the primary apparatus is resident in the cache 130 for the host computer 10 is "1" or not, by referring to the dual writing pair control table 122.

When it is determined in step S113 that the data of the primary apparatus is resident in the cache 130 for the host computer 10, the copying method determination program 119 executes the copy processing by the host computer 10 (S122).

On the other hand, when it is determined in step S113 that the data of the primary apparatus is not resident in the cache 130 for the host computer 10, the copying method determination program 119 acquires the inter-channel transfer amount between the host and the DKC (S114). Specifically speaking, the copying method determination program 119 acquires the inter-channel transfer amount between the host and the DKC with respect to a target volume by referring to the transfer amount management table 123.

Then, the copying method determination program 119 acquires the transfer amount between the DKCs (S115). Specifically speaking, the copying method determination program 119 acquires the transfer amount between the first DKC 20A and the second DKC 20B for the target volume by referring to the transfer amount management table 123.

Then, the copying method determination program 119 estimates copy end time of the host-based copying and the inter-DKC copying (S116). Specifically speaking, the copying method determination program 119 calculates the copy time of the host-based copying according to the aforementioned Expression (1) and calculates the copy processing time of the inter-DKC copying according to the aforementioned Expression (2) on the basis of the transfer amount and the difference amount acquired in step S114 and step S115, thereby calculating the copy end time when executing the copy processing by the respective methods.

Then, the copying method determination program 119 judges whether the copy processing via the host computer 10 terminates earlier than the copy processing between the DKCs or not (S117). Specifically speaking, the copying method determination program 119 judges which copy processing, either the copy processing via the host or the copy processing between the DKCs, terminates earlier on the basis of the copy end time calculated in step S116.

When it is determined in step S117 that the copy processing via the host computer 10 terminates earlier, the copying method determination program 119 executes the copy processing by the host computer 10 (S122).

On the other hand, when the copy processing via the host computer 10 does not terminate earlier in step S117, that is, when it is determined that the copy processing between the DKCs 20 terminates earlier, the copying method determination program 119 acquires the latest input-output results from the DKCs 20 (S118). Specifically speaking, the copying method determination program 119 acquires maximum copy processing time, minimum copy processing time, and average copy processing time of a volume immediately before the target volume by referring to the copy processing time management table 121, and checks whether the DKCs 20 did not execute prolonged copy processing, on the basis of an update time point of the maximum copy processing time and an update time point of the average copy processing time.

When it is determined in step S118 that the DKCs 20 did not execute the prolonged copy processing, the copying method determination program 119 issues an instruction to the DKCs 20 to execute the differential copying (S123).

On the other hand, when it is determined in step S118 that the DKCs 20 executed the prolonged copy processing, the copying method determination program 119 acquires the processor usage rate of the second DKC 20B (S120). Specifically speaking, the copying method determination program 119 acquires the processor usage rate of the second DKC 20B by referring to the copy processing time management table 121.

Then, the copying method determination program 119 judges whether the CPU usage rate of the host computer 10 is higher than the CPU usage rate of the second DKC 20B (S121).

When it is determined in step S121 that the CPU usage rate of the host computer 10 is higher than the CPU usage rate of the second DKC 20B, the copying method determination program 119 issues an instruction to the DKCs 20 to execute the differential copying (S123).

On the other hand, when it is determined in step S121 that the CPU usage rate of the host computer 10 is lower than the CPU usage rate of the second DKC 20B, the copying method determination program 119 executes the copy processing by the host computer 10 (S122).

Incidentally, the above-described copy method determination processing determines either the copy processing by the host computer 10 or the copy processing by the DKCs 20 when the copy processing is to be executed on a logical volume basis; however, the invention is not limited to this example. For example, when the present invention is applied to a large-capacity apparatus of 100 GB or more, the host computer 10 may be designed to perceive the information about the copy processing such as the copy processing status and the CPU usage rates from time to time and determine either the copy processing by the host computer 10 or the copy processing by the DKCs 20 during the execution of the copy processing so as to switch to an optimum copy processing method.

(4) Advantageous Effects of this Embodiment

According to the above-described embodiment, the optimum copy method is selected from either the copy processing via the host computer 10 or the copy processing between the DKCs 20 in light of the difference data amount between the primary and secondary apparatuses when resynchronizing the copy pair, the copy processing end time calculated from the data transfer amount between the apparatuses, as well as the CPU usage rate of the host computer 10, the processor usage rates of the first DKC 20A and the second DKC 20B, and the copy processing status. As a result, the copy processing time can be reduced and the fear of delaying the business start time during the daytime due to the copy processing can be avoided.

REFERENCE SIGNS LIST 10 host computer
110 memory
111 input-output control program
112 static data input-output control unit
113 processor usage rate calculation program
114 host-based copying time estimation program
115 inter-DKC copying time estimation program
116 inter-channel transfer amount calculation program
117 difference amount analysis program
118 host-based copying program
119 copying method determination program
120 differential copying control program
121 copy processing time management table
122 dual writing pair control table
123 transfer amount management table
130 cache
20A first DKC
20B second DKC
200 controller
211 memory
212 cache
220 disks
30 network

The invention claimed is:

1. A copy processing management system comprising:
a first disk control device configured to manage a primary disk storage apparatus;
a second disk control device configured to manage a secondary disk storage apparatus; and
a host computer configured to synchronize the primary disk storage apparatus with the secondary disk storage apparatus and to manage the primary disk storage apparatus and the secondary disk storage apparatus as a copy pair,
wherein the host computer is configured to:
when the primary disk storage apparatus and the secondary disk storage apparatus are separated from each other after a dual writing operation and the copy pair regarding which data is written to only the primary disk storage apparatus is to be resynchronized, select either a host-computer-based copy processing executed via the host computer or an inter-disk-control-device copy processing executed between the first disk control device and the second disk control device on the basis of information about copy processing, and
wherein the host computer is further configured to:
acquire, as the information about the copy processing, a difference data amount between the primary disk storage apparatus and the secondary disk storage apparatus, a data transfer amount between the respective apparatuses, and performance information of the respective apparatuses including a processor usage rate of the host computer, a processor usage rate of the first disk control device and a processor usage rate of the second disk control device, a status of the copy processing of the primary disk storage apparatus and the secondary disk storage apparatus, and a data update status of the primary disk storage apparatus and the secondary disk storage apparatus, and
select either the host-computer-based copy processing or the inter-disk-control-device copy processing on the basis of a combination of the information about the copy processing.

2. The copy processing management system according to claim 1,
wherein the host computer is further configured to:
calculate the difference data amount between the primary disk storage apparatus and the secondary disk storage apparatus on the basis of difference map information indicative of information of data update to the primary disk storage apparatus; and
upon determining, on the basis of the difference data amount, that all pieces of data of the primary disk storage apparatus have been updated, select the inter-disk-control-device copy processing and execute processing for full copying of the primary disk storage apparatus.

3. The copy processing management system according to claim 1,
wherein the host computer is further configured to:
calculate the difference data amount between the primary disk storage apparatus and the secondary disk storage apparatus on the basis of difference map information indicative of information of data update to the primary disk storage apparatus; and
upon determining, on the basis of the difference data amount, that any data of the primary disk storage apparatus has not been updated, immediately restore the copy pair without executing the copy processing.

4. The copy processing management system according to claim 1,
wherein the host computer is further configured to:
upon the resynchronization, select the host-computer-based copy processing when data of the primary disk storage apparatus is being updated and the processor usage rate of the host computer is equal to or lower than a specified value.

5. The copy processing management system according to claim 1,
wherein the host computer is further configured to:
calculate an end time of the copy processing executed via the host computer and an end time of the copy processing executed between the first disk control device and the second disk control device on the basis of the difference data amount and the data transfer amount between the respective apparatuses; and selects the one of the host-computer-based copy processing and the inter-disk-control-device copy processing having an end time which is earlier.

6. The copy processing management system according to claim 1,
wherein the host computer is further configured to:
acquire a processing time required to form the copy pair; and
select the host-computer-based copy processing when a maximum copy time and an average copy time required to form the copy pair are updated and the processor usage rate of the first disk control device or the second disk control device is higher than the processor usage rate of the host computer.

7. The copy processing management system according to claim 1,
wherein the host computer is further configured to:
select the host-computer-based copy processing when update data of the first primary disk storage apparatus is resident in a cache for the host computer.

8. The copy processing management system according to claim 1,
wherein the host computer is further configured to:
select either the host-computer-based copy processing or the inter-disk-control-device copy processing according to a user designation.

9. A copy processing management method for synchronizing a primary disk storage apparatus with a secondary disk storage apparatus and managing the primary disk storage apparatus and the secondary disk storage apparatus as a copy pair, the copy processing management method comprising:

synchronizing, by a host computer, a first disk control device configured to manage the primary disk storage apparatus with a second disk control device configured to manage the secondary disk storage apparatus, and managing, by the host computer, the primary disk storage apparatus and the secondary disk storage apparatus as the copy pair;

separating, by the host computer, the primary disk storage apparatus from the secondary disk storage apparatus after a dual writing operation and resynchronizing the copy pair regarding which data is written to only the primary disk storage apparatus;

acquiring, by the host computer, information about copy processing; and selecting, by the host computer, either a host-computer-based copy processing executed via the host computer or an inter-disk-control-device copy processing executed between the first disk control device and the second disk control device on the basis of a combination of the information about the copy processing, wherein the acquired information about copy processing includes a difference data amount between the primary disk storage apparatus and the secondary disk storage apparatus, a data transfer amount between the respective apparatuses, and performance information of the respective apparatuses including a processor usage rate of the host computer, a processor usage rate of the first disk control device and a processor usage rate of the second disk control device, a status of the copy processing of the primary disk storage apparatus and the secondary disk storage apparatus, and a data update status of the primary disk storage apparatus and the secondary disk storage apparatus.

* * * * *